United States Patent
Freitag et al.

(10) Patent No.: US 10,224,518 B2
(45) Date of Patent: Mar. 5, 2019

(54) ELECTROCHEMICAL CELL CASING HAVING AN OPEN-ENDED MAIN BODY PORTION OF GRADE 5 OR 23 TITANIUM CLOSED BY UPPER AND LOWER LIDS OF GRADE 1 OR 2 TITANIUM

(71) Applicant: Greatbatch Ltd., Clarence, NY (US)

(72) Inventors: Gary Freitag, East Aurora, NY (US); Xiangyang Dai, East Amherst, NY (US); Mark J. Roy, Buffalo, NY (US); Robert S. Rubino, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 15/398,253

(22) Filed: Jan. 4, 2017

(65) Prior Publication Data

US 2017/0117512 A1   Apr. 27, 2017

Related U.S. Application Data

(63) Continuation-in-part of application No. 13/463,936, filed on May 4, 2012.

(Continued)

(51) Int. Cl.
*H01M 2/02* (2006.01)
*H01M 10/058* (2010.01)
(Continued)

(52) U.S. Cl.
CPC ......... *H01M 2/0285* (2013.01); *H01M 2/026* (2013.01); *H01M 2/0217* (2013.01); *H01M 2/0426* (2013.01); *H01M 2/0486* (2013.01); *H01M 2/06* (2013.01); *H01M 2/065* (2013.01); *H01M 4/06* (2013.01); *H01M 4/131* (2013.01); *H01M 4/133* (2013.01); *H01M 4/134* (2013.01); *H01M 4/136* (2013.01); *H01M 4/382* (2013.01); *H01M 4/485* (2013.01); *H01M 4/505* (2013.01); *H01M 4/525* (2013.01); *H01M 4/587* (2013.01);

(Continued)

(58) Field of Classification Search
CPC ... H01M 2/0257; H01M 2/026; H01M 2/0267
See application file for complete search history.

(56) References Cited

U.S. PATENT DOCUMENTS

| 5,811,206 A | 9/1998 | Sunderland et al. |
| 7,210,966 B2 | 5/2007 | Taylor et al. |

(Continued)

OTHER PUBLICATIONS

Boyer, et al., "Titanium Alloys", ASM Material Properties Handbook, 2003, 180, 497-498.

*Primary Examiner* — Stephan J Essex
(74) *Attorney, Agent, or Firm* — Michael F. Scalise

(57) ABSTRACT

An electrochemical cell, preferably a secondary, rechargeable cell, including a casing comprised of a main body portion having opposed lower and upper open ends closed by respective lower and upper lids is described. The main body portion is composed of titanium Grades 5 or 23 having a relatively high electrical resistivity material while the lower and upper lids are composed of titanium Grades 1 or 2. The lids are preferably joined to the main body portion using laser welding. The combination of these differing titanium alloys provides a cell casing that effectively retards eddy current induced heating during cell recharging.

16 Claims, 6 Drawing Sheets

Related U.S. Application Data

(60) Provisional application No. 61/483,319, filed on May 6, 2011.

(51) Int. Cl.

| | | |
|---|---|---|
| *H01M 2/04* | (2006.01) | |
| *H01M 2/06* | (2006.01) | |
| *H01M 4/06* | (2006.01) | |
| *H01M 6/14* | (2006.01) | |
| *H01M 4/134* | (2010.01) | |
| *H01M 4/133* | (2010.01) | |
| *H01M 4/131* | (2010.01) | |
| *H01M 4/136* | (2010.01) | |
| *H01M 4/38* | (2006.01) | |
| *H01M 4/58* | (2010.01) | |
| *H01M 4/587* | (2010.01) | |
| *H01M 4/583* | (2010.01) | |
| *H01M 4/525* | (2010.01) | |
| *H01M 4/505* | (2010.01) | |
| *H01M 4/485* | (2010.01) | |
| *H01M 10/0525* | (2010.01) | |
| *H01M 4/02* | (2006.01) | |

(52) U.S. Cl.
  CPC ....... *H01M 4/5825* (2013.01); *H01M 4/5835* (2013.01); *H01M 6/14* (2013.01); *H01M 10/058* (2013.01); *H01M 10/0525* (2013.01); H01M 2004/027 (2013.01); H01M 2004/028 (2013.01); Y10T 29/4911 (2015.01)

(56) References Cited

U.S. PATENT DOCUMENTS

| | | |
|---|---|---|
| 7,337,003 B2 | 2/2008 | Malinowski et al. |
| 7,493,167 B2 | 2/2009 | Hussein et al. |
| 2003/0003356 A1* | 1/2003 | Tsukamoto ........... H01M 2/027 429/176 |
| 2007/0009789 A1* | 1/2007 | Moceri ................. H01M 2/263 429/136 |
| 2007/0117011 A1* | 5/2007 | Myerberg ............. B32B 15/017 429/164 |
| 2008/0097554 A1 | 4/2008 | Payne et al. |
| 2011/0022140 A1 | 1/2011 | Stevenson et al. |

* cited by examiner

ELECTROCHEMICAL CELL CASING HAVING AN OPEN-ENDED MAIN BODY PORTION OF GRADE 5 OR 23 TITANIUM CLOSED BY UPPER AND LOWER LIDS OF GRADE 1 OR 2 TITANIUM

CROSS-REFERENCE TO RELATED APPLICATIONS

This is a continuation-in-part application of U.S. patent application Ser. No. 13/463,936, filed on May 4, 2012, now abandoned, which claims priority from U.S. provisional patent application Ser. No. 61/483,319, filed on May 6, 2011.

BACKGROUND OF THE INVENTION

1. Field of the Invention

The present invention relates to the art of electrochemical cells, and more particularly, to an improved electrochemical cell having a casing formed of dissimilar metals. More specifically, the present invention is of an electrochemical cell and manufacturing process thereof comprising an electrochemical cell enclosure or casing composed of dissimilar titanium alloys.

2. Prior Art

The recent rapid developments in small-sized electronic devices having various shape and size requirements require comparably small-sized electrochemical cells of different designs that can be easily manufactured and used in these electronic devices. Preferably, the electrochemical cell has a high energy density and is of a robust construction. Such electrochemical cells are commonly used to power automated implantable medical devices (AIMD) such as pacemakers, neurostimulators, defibrillators and the like.

One commonly used cell configuration is a secondary or rechargeable electrochemical cell. These secondary electrochemical cells are designed to reside within the medical device and remain implanted within the body over relatively long periods of time of up to 5 to 10 years, or more. As such, these secondary electrochemical cells are required to be recharged from time to time to replenish electrical energy in the cell.

Secondary electrochemical cells, such as those used to power automated implantable medical devices (AIMD), are commonly recharged through an inductive means whereby energy is wirelessly transferred from an external charging device through the body of the patient to the cell residing within the AIMD. Electro-magnetic (EM) induction in which EM fields are transmitted from an external charger to the cell within the AIMD is a common means through which the electrochemical cell is recharged. Thus, when the electrochemical cell requires recharging, the patient can activate the external charger to transcutaneously (i.e., through the patient's body) recharge the cell.

During the recharging process, a portion of the external charging unit comprising a plurality of charging coils is generally placed near the AIMD outside the patient's body. Due to this close proximity, the magnetic field produced by the charge coil(s) may induce eddy current heating of the cell enclosure or casing. Eddy current heating of the cell enclosure generally occurs when eddy currents, emanating from the charging coil, interact with the conductive material of the enclosure or casing. This interaction generates heat there within.

Eddy current heating results when a conductive material experiences changes in a magnetic field. In the case of recharging an electrochemical cell within an implanted medical device, eddy current heating occurs as the varying magnetic fields emanating from the coils of the external charging unit move past the stationary cell enclosure or casing. Eddy current heating is proportional to the strength of the magnetic field and the thickness of the conductive material from which the casing is manufactured. In addition, eddy current heating is inversely proportional to electrical resistivity and density of the casing material. Therefore, eddy current heating can be reduced by lowering the intensity of the magnetic field and the use of a casing material of increased electrical resistivity and reduced thickness.

As the AIMD is recharged, the phenomena of eddy current heating may result in excessive heating of the cell casing. This, therefore, could adversely affect the function of the electrochemical cell and/or the AIMD within which it resides.

Currently, device recharging rates and recharge time intervals must be limited to minimize the possibility of excessive heating. This results in reduced battery charge capacities, which increases the charging time interval. In addition, the number of recharging events may need to be increased to compensate for the reduced charge capacity. Therefore, the patient is required to recharge the electrochemical cell more frequently and for longer periods of time, thus equating to an overall longer recharging time.

Therefore, what is desired is an electrochemical cell enclosure or casing that minimizes eddy current heating and allows for increased charge rates and reduced charging times. In an embodiment of the present invention, reduction of eddy current heating is accomplished through the use of an enclosure or casing composed of a material comprising a relatively high electrical resistivity. Examples of such materials include Grade 5 titanium and Grade 23 titanium, which comprise various amounts of vanadium and aluminum. Specifically, these grades of titanium comprise about four percent vanadium and about six percent aluminum. As such, these materials exhibit relatively high electrical resistivities, which minimize eddy current heating.

However, these grades of titanium are generally known to be more refractive as compared to other materials, particularly other titanium alloys and, consequently, to exhibit increased brittleness and hardness. As a result, forming an enclosure of Grade 5 titanium or Grade 23 titanium is difficult. For example, forming processes used during the manufacture of a cell enclosure or casing such as drawing, forming, rolling, stamping and punching are limited due to the relatively increased brittleness of Grade 5 titanium and Grade 23 titanium.

Furthermore, the ability to withstand case deformation caused by normal swelling of the electrochemical cell over time is also limited. Such swelling and repeated stress cycling due to repeated charge-discharge cycles may crack the enclosure or casing, which may result in a breach of the cell's hermeticity. A loss of hermeticity could allow for leakage of electrolyte from the cell, which could damage the AIMD.

Therefore, what is needed is an electrochemical cell enclosure that is both mechanically robust and resistive to eddy current heating. The present invention addresses the shortcomings of the prior art by providing an electrochemical cell comprising an enclosure or casing that is both resistive to eddy current heating, mechanically robust, and easily manufacturable.

SUMMARY OF THE INVENTION

The present invention relates to an electrochemical cell and method of manufacture thereof comprising an enclosure or casing composed of a combination of dissimilar titanium alloys. Specifically, the cell casing comprises a main body portion composed of a relatively high electrical resistivity material, such as Grade 5 titanium or Grade 23 titanium and a lid or lids composed of a more ductile material, such as Grade 1 titanium or Grade 2 titanium. The lid is joined to the body of the casing through a welding process such as laser welding.

The combination of these differing materials provides a casing that effectively retards eddy current heating, but is mechanically robust. Specifically, the cell casing of the present invention is a combination of eddy current resistive Grade 5 titanium or Grade 23 titanium with that of the more ductile Grade 1 titanium or Grade 2 titanium, thereby providing a casing that is both resistive to eddy currents and mechanically tough.

The joining of a more ductile material, such as Grade 1 titanium or Grade 2 titanium to the more brittle Grade 5 titanium or Grade 23 titanium blends the added benefits of each of the respective materials. Specifically, eddy current induced heating is retarded by use of a casing body of increased ductility joined to a more brittle lid in a hermetic manner. In particular, the titanium alloy formed at the weld between such diverse materials exhibits mechanical properties that lie between those of the respective titanium grades. A titanium composite material that is both mechanically strong and durable is formed where the different titanium grades are joined. Therefore, the cell casing is more capable of withstanding the mechanical stresses of cell swelling as well as providing a more robust cell design that is able to endure subsequent processing steps.

Cell components which generate electrochemical energy reside within the enclosure body or cell casing. These components may comprise at least one anode separated from at least one cathode by a separator, and an activating electrolyte. A perspective view of a conventional prismatic electrochemical cell 10 is shown in FIG. 1. The cell 10 includes an enclosure or casing 12 having spaced-apart front and back walls 14 and 16 joined by curved end walls 18 and 20 and a curved bottom wall 22. The casing has an open upper end closed by a lid 26. An opening 24 provided in the lid 26 is used for filling the casing 12 with an electrolyte after the cell components have been assembled therein. In its fully assembled condition shown in FIG. 1, a closure means 28 is hermetically sealed in opening 24 to close the cell. A terminal pin 30 is electrically insulated from the lid 26 and casing 12 by a glass-to metal seal 32, as is well known to those skilled in the art.

DETAILED DESCRIPTION OF THE PREFERRED EMBODIMENTS

Figure 2:
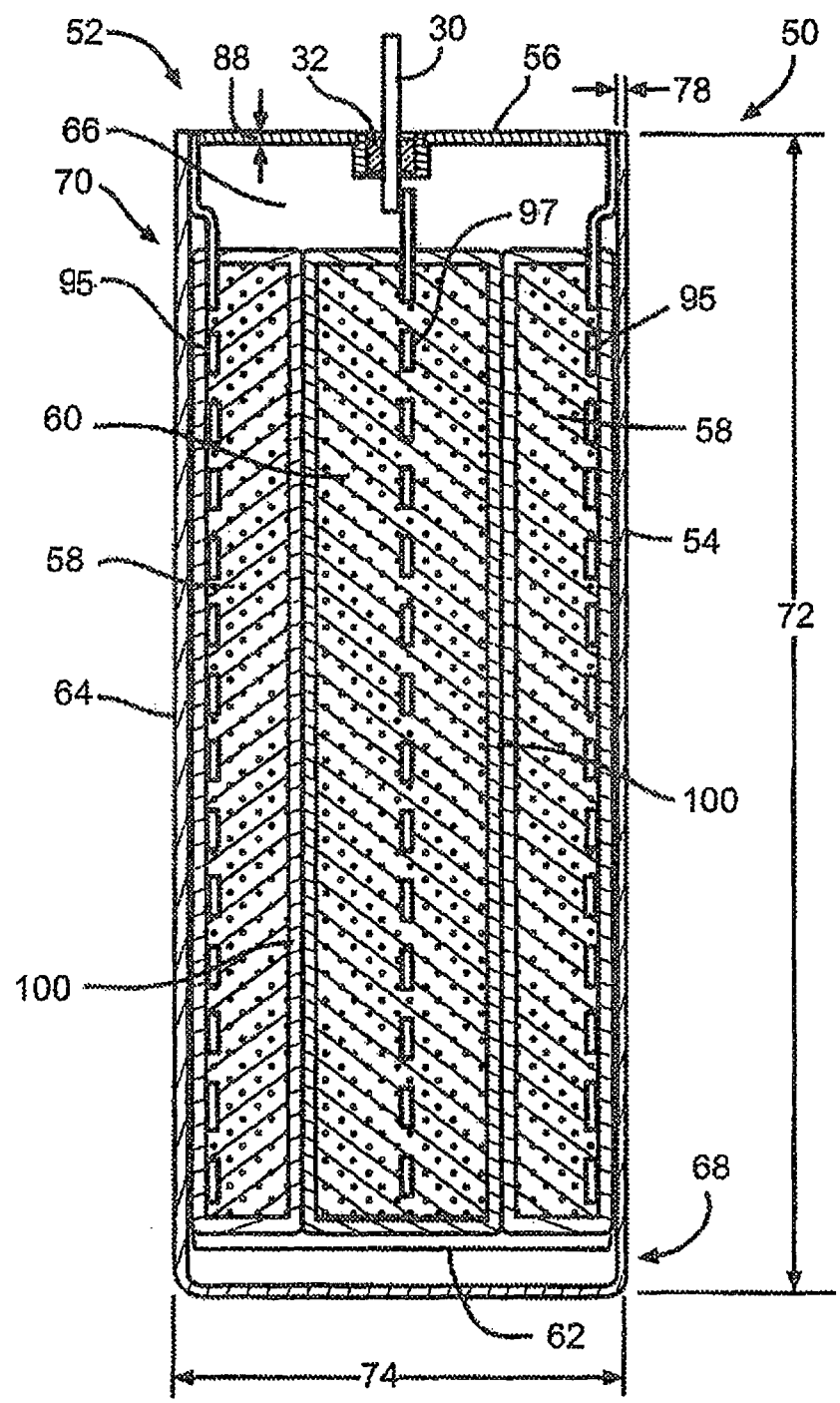
FIG. 2 is a cross-sectional view illustrating an exemplary electrochemical cell 50 comprising an enclosure or casing according to one embodiment of the present invention.

Referring now to FIG. 2, there is shown an exemplary electrochemical cell 50 comprising an enclosure or casing 52 according to the present invention comprising two dissimilar titanium alloys. Specifically, the casing 52 comprises an open-ended container 54 and a lid 56 that are joined together. In a preferred embodiment, the open-ended container 54 is composed of a relatively high electrical resistivity material such as Grade 5 titanium or Grade 23 titanium and the lid 56 is composed of a more ductile material such as Grade 1 titanium or Grade 2 titanium.

Within the casing 52 resides at least one of an anode 58 and a cathode 60 prevented from direct physical contact with each other by a suitable separator to thereby provide an electrode assembly 62. The anode and cathode 58, 60 are activated by an electrolyte (not shown) filled into the casing 52.

In a first embodiment of the present invention, the open-ended container 54 of the casing 52 comprises a sidewall 64 that encompasses an enclosure space 66 there within. The sidewall 64 extends from a bottom wall 68 to an upper open end 70.

Figure 4:
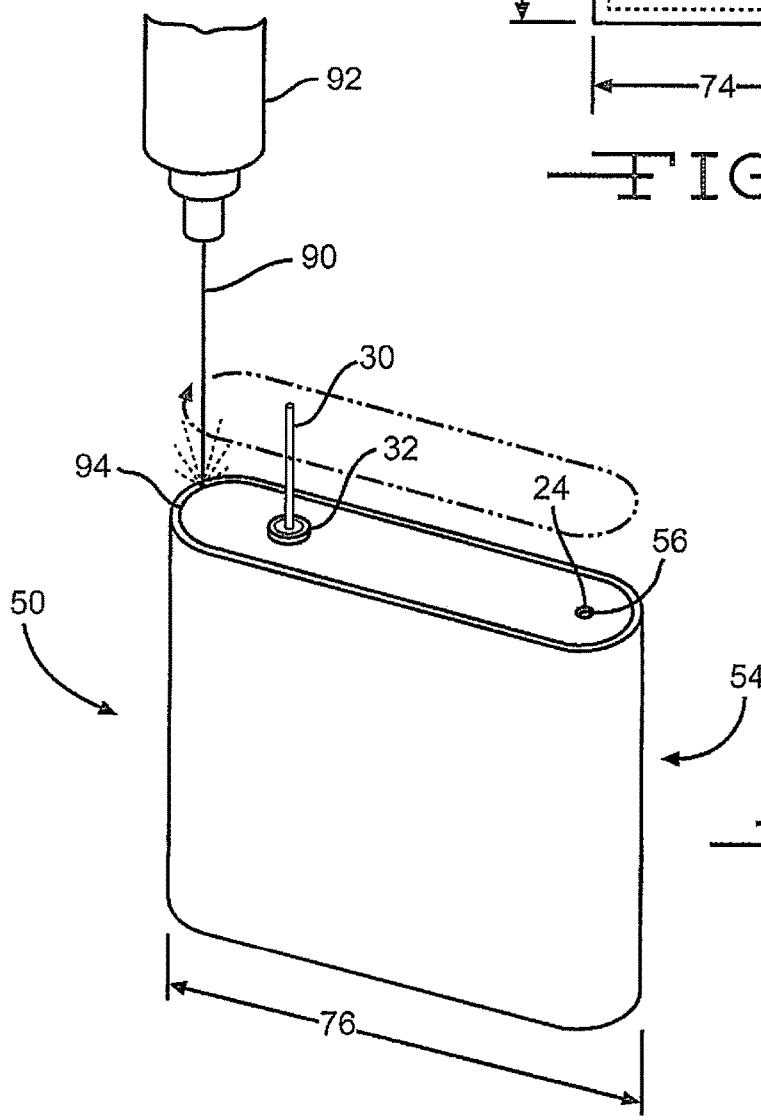
FIG. 4 illustrates a perspective view of the lid 56 being joined to the enclosure body 54 of the electrochemical cell 50.

In the embodiment shown in FIG. 4, the open-ended container 54 of the casing 52 may have a curved cross-section. Alternatively, the open-ended container 54 may comprise a cross-section of a shape that is rectangular, elliptical or circular. In a preferred embodiment, the open-ended container 54 has a body height 72 ranging from about 0.5 inches to about 2 inches, a body width 74 ranging from about 0.1 inches to about 0.5 inches, and a body depth 76 (FIG. 4) ranging from about 0.5 inches to about 2.0 inches. In addition, the open-ended container 54 comprises a body sidewall thickness 78 ranging from about 0.01 inches to about 0.10 inches. The thickness of the sidewall 64 is designed to reduce the occurrence of eddy current heating.

Figure 3:
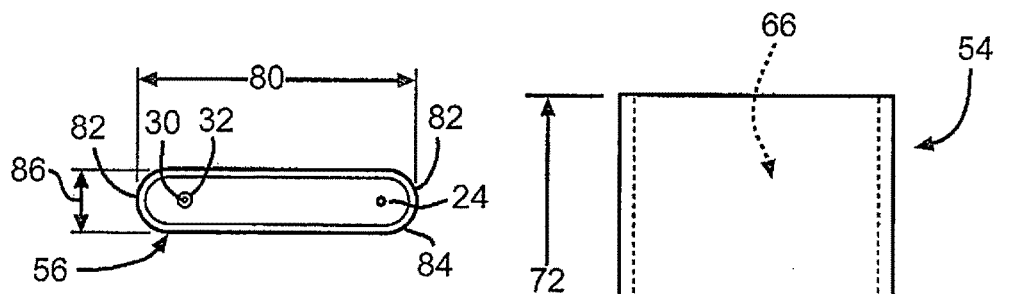
FIG. 3 is a top view of a lid 56 according to the present invention.
Figure 3A:
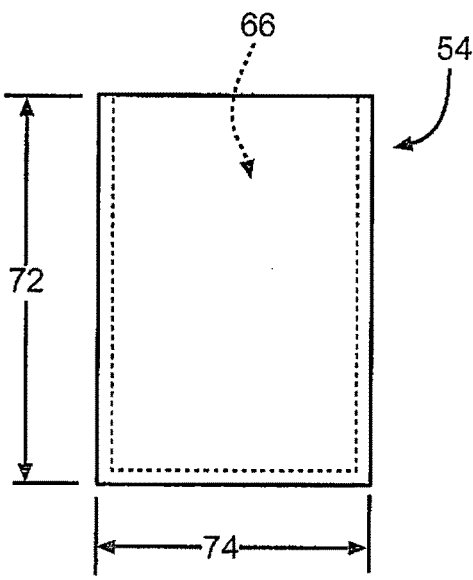
FIG. 3A is a side view of one embodiment of an enclosure body 54 for an electrochemical cell according to the present invention.

The lid 56 of the casing 52 is designed to cover and seal the open end 70 of the container 54. In an embodiment, the lid 56 is of an elongated length 80 with curved ends 82 (FIG. 3). Preferably, the ends 82 of the lid 56 have a radius of curvature 84 ranging from about 0.01 inches to about 2.0 inches. Alternatively, the ends of the lid 56 may be non-curved with a rectangular or square end. These curved ends 82, which are joined to the body portion of the casing 52, reduce mechanical stresses and provide a more robust design.

In a preferred embodiment, the length 80 of the lid 56 ranges from about 0.5 inches to about 2 inches, a lid width 86 ranges from about 0.1 inches to about 0.5 inches, and a lid thickness 88 ranges from about 0.01 inches to about 0.25 inches.

As previously mentioned, the open-ended container and lid 54, 56 are comprised of biocompatible conductive materials. In a preferred embodiment, the open-ended container 54 is composed of a material of a relatively high electrical resistivity. Preferably, the electrical resistivity of the open-ended container 54 ranges from about $1.0 \times 10^{-4}$ ohm-cm to about $2.0 \times 10^{-1}$ ohm-cm measured at about 37° C. Most preferably, the open-ended container 54 of the casing 52 is composed of Grade 5 titanium or Grade 23 titanium.

In comparison, lid 56 of the casing 52 is composed of a biocompatible material that is relatively more ductile, i.e. of a material that is not as hard as the material comprising the open-ended container 54. Preferably, the lid 56 is composed of a material having a Vickers hardness (HK100) value ranging from 100 to 300. Most preferably, the lid 56 is composed of Grade 1 titanium or Grade 2 titanium.

Grade 1 titanium, as defined by ASTM specification B348, is a conductive material of a composition comprising the following weight percentages: carbon (C) less than about 0.10, iron (Fe) less than about 0.20, hydrogen (H) less than about 0.015, nitrogen (N) less than about 0.03, oxygen (O) less than about 0.18, the remainder comprising titanium (Ti).

Grade 2 titanium, as defined by ASTM specification B348, is a conductive material of a composition comprising the following weight percentages: carbon (C) less than about 0.10, iron (Fe) less than about 0.30, hydrogen (H) less than about 0.015, nitrogen (N) less than about 0.03, oxygen (O) less than about 0.25, the remainder comprising titanium (Ti).

Grade 5 titanium, as defined by ASTM 5348, is a conductive material of a composition comprising the following weight percentages: carbon (C) less than about 0.10, iron (Fe) less than about 0.40, hydrogen (H) less than about 0.015, nitrogen (N) less than about 0.05, oxygen (O) less than about 0.20, vanadium (V) ranging from about 3.5 to about 4.5, the remainder comprising titanium (Ti).

Grade 23 titanium, as defined by ASTM B348, is a conductive material of a composition comprising the following weight percentages: carbon (C) less than about 0.08, iron (Fe) less than about 0.25, nitrogen (N) less than about 0.05, oxygen (O) less than about 0.2, aluminum (Al) ranging from about 5.5 to about 6.76, vanadium (V) ranging from about 3.5 to about 4.5, hydrogen (H) less than about 0.015, the remainder titanium (Ti).

Grade 1 titanium has an electrical resistivity of about $4.5 \times 10^{-5}$ ohm-cm at about 37° C. and Grade 2 titanium has an electrical resistivity of about $5.2 \times 10^{-5}$ ohm-cm at about 37° C. In comparison, Grade 5 titanium has an electrical resistivity of about $1.78 \times 10^{-4}$ ohm-cm at about 37° C. and Grade 23 titanium has an electrical resistivity of about $1.71 \times 10^{-1}$ ohm-cm at about 37° C. (*ASM Material Properties Handbook: Titanium Alloys*, Rodney Boyer, Gerhard Weisch, and E. W. Collings, p. 180, 497-498, 2003). As given by the data above, Grade 5 titanium and Grade 23 titanium have respective electrical resistivities that are greater than those of Grade 1 titanium and Grade 2 titanium.

Once the open-ended container 54 and lid 56 are formed to the desired form and dimensions, the lid 56 is positioned over the top open end 70 of the open-ended container 54. Thus, the positioning of the lid 56 with the open-ended container 54 seals the enclosure space 66 there within. Alternatively, the lid 56 may be positioned at the bottom end of the open-ended container 54 of the casing 52, sealing the enclosure space 66 there within, if desired.

Prior to joining the lid 56 to the open-ended container 54, the electrode assembly 62 is positioned within the enclosure space 66 of the open-ended container 54. Once the electrode assembly 62 is appropriately positioned there within, the lid 56 is fit over the opening of the open-ended container 54. In a preferred embodiment, the outer perimeter of the lid 56 is positioned within an interior body perimeter formed by the interior wall surface of the open-ended container 54. Alternatively, the lid 56 may be positioned such that the bottom surface of the lid 56 contacts the sidewall of the open-ended container 54.

As shown in FIG. 4, the lid 56 is joined to the open-ended container 54 by welding. In a preferred embodiment, a laser beam 90 emanating from a laser weld instrument 92 is focused between the perimeter of the lid 56 and an inner perimeter of the sidewall for the open-ended container 54 to thereby form a weld 94 therebetween. Alternatively, other joining methods such as resistance welding, arc welding, magnetic pulse welding, or soldering may be used to join the lid 56 to the open-ended container 54. It will be apparent to those skilled in the art that conventional welding parameters may be used in joining the two portions 54, 56 together.

Figure 5:
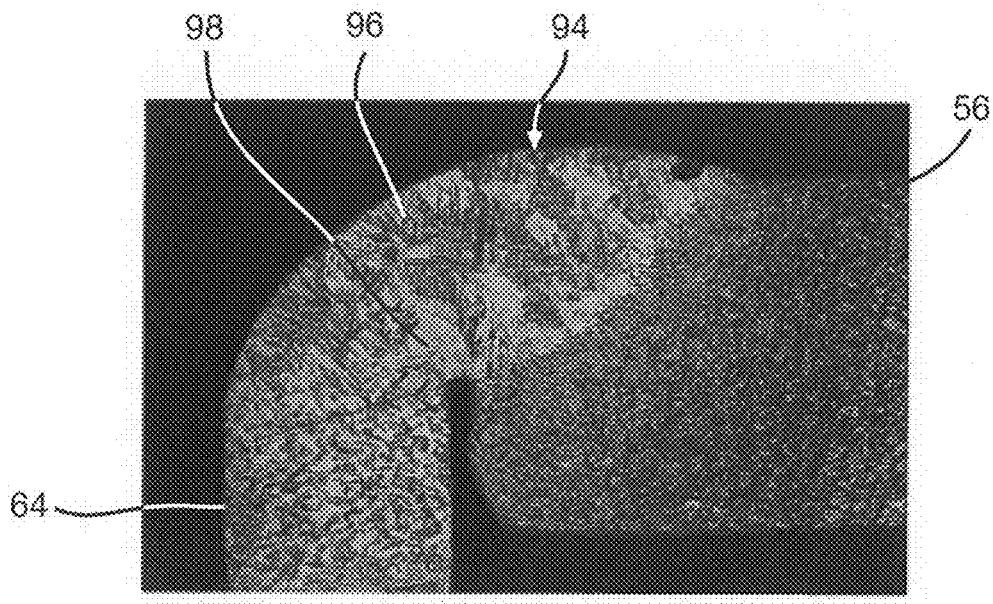
FIG. 5 is a micrograph showing the microstructure of the weld between a lid composed of Grade 5 titanium and an enclosure body composed of Grade 5 titanium.
Figure 6:
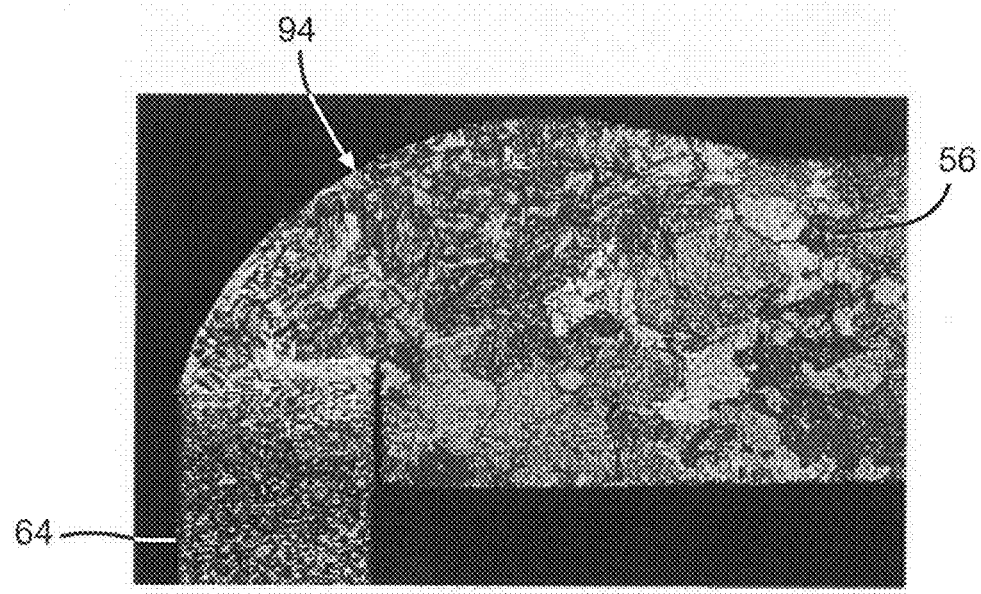
FIG. 6 is a micrograph showing the microstructure of a weld between a lid composed of Grade 2 titanium and an enclosure body composed of Grade 5 titanium.
Figure 7:
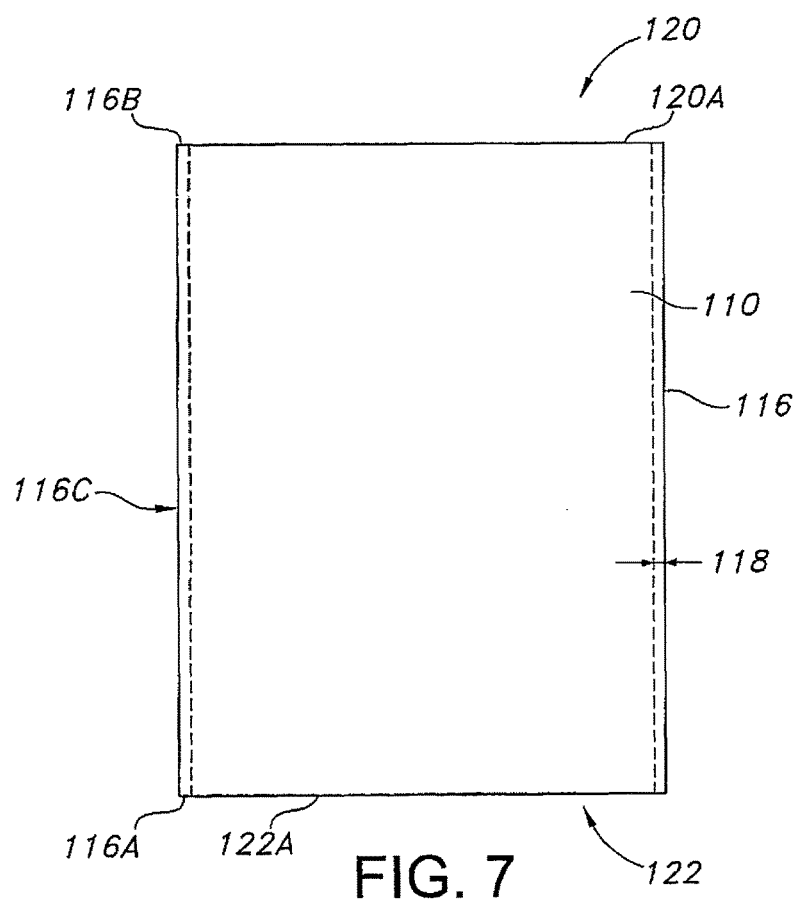
FIG. 7 is a side elevational view of an open main body portion 110 for a casing according to another embodiment of the present invention.

FIGS. 5 and 6 illustrate embodiments of the microstructure of the weld 94 between the lid and open-ended container 56, 54 of the casing 52. Specifically, FIG. 5 shows the microstructure of a laser weld 94 formed between a lid 56 and the open-ended container 54 when both are of Grade 5 titanium. FIG. 6 shows the microstructure of the weld 94 formed between the lid 56 comprised of Grade 1 titanium and the open-ended container 54 comprised of Grade 5 titanium. More specifically, FIG. 6 shows the microstructure of a laser weld 94 formed between the Grade 1 titanium lid 56 and the Grade 5 titanium open-ended container 54.

As can be seen in the micrograph of FIG. 5, the microstructure exhibits a mirror planes area 96 inter-dispersed with titanium grain structures 98. In comparison, the microstructure shown in FIG. 6 exhibits a random titanium grain structure, which is structurally stronger in terms of its tensile strength than the mirror planes of FIG. 5.

A series of micro-hardness measurements were taken of the welds shown in FIGS. 5 and 6. Table I shown below details the micro-hardness measurements of the respective welds 94.

TABLE I

| HK100 | Body Portion Hardness | Lid Portion Hardness | Weld Joint Hardness |
| --- | --- | --- | --- |
| Grade 5 Ti Body Grade 5 Ti Lid | 350-400 | 320-440 | 410-440 |
| Grade 5 Ti Body Grade 1 Ti Lid | 350-400 | 100-200 | 220-320 |

As shown above, the micro-hardness measurements of the weld between the Grade 5 titanium open-ended container 54 and Grade 1 titanium lid 56 shown in FIG. 6 are lower in comparison to the micro-hardness measurements of the weld between the Grade 5 titanium open-ended container and lid 54, 56 shown in FIG. 5. As shown by the data above, the weld between the open-ended container 54 and the lid 56 composed of titanium Grades 5 and 1, respectively, are less brittle and therefore more robust than the weld between the Grade 5 titanium open-ended container and lid 54, 56.

Based on the above measured micro-hardness values, a weld between Grade 5 titanium or Grade 23 titanium to that of Grade 1 titanium or Grade 2 titanium is preferred to that of a weld between two pieces of Grade 5 titanium. As shown above, a weld, specifically a laser weld, formed between the different grades of titanium having a difference in HK100 Vickers micro-hardnesses ranging from about 150 to 350 is preferred.

In addition, a pressure test was performed which compared the strength and integrity of the different welds 94 of the cell casings 52. A total of ten casings 52 were tested. Five casings were constructed with a Grade 5 titanium open-ended container 54 closed with a Grade 5 titanium lid 56, and five casings 52 were constructed with a combination of a Grade 5 titanium open-ended container 54 and a Grade 1 titanium lid 56. A laser weld 94 was used to join and seal the lid 56 to the open-ended container 54 for all casing samples.

During the test, a stream of water was introduced into the enclosure space 66 of each casing 52 until the weld 94 ruptured. The increasing pressure, in pounds per square inch (psi), was measured and the resulting rupture pressure was recorded. Results of the pressure test showed that the weld 94 between the Grade 5 titanium open-ended container 54 and the Grade 1 lid 56 withstood an average pressure of about 1,497 psi, whereas the weld 94 between the Grade 5 titanium open-ended container and lid portions 54, 56 withstood an average of about 767 psi. Thus, the casing 52 comprising the Grade 5 titanium open-ended container 54 and the Grade 1 titanium lid 56 having the greater rupture pressure is considered to be more robust than the casing 52 comprising the Grade 5 titanium body and lid 54, 56.

Referring back to FIG. 2, the exemplary electrochemical cell 50 of the present invention is constructed in what is generally referred to as a case negative orientation with the anode 58 electrically connected to the container or lid 54, 56 via a anode current collector 95 while the cathode 60 is electrically connected to the terminal pin 30 via a cathode current collector 97. Alternatively, a case positive cell design may be constructed by reversing the connections. In other words, terminal pin 30 is connected to the anode 58 via the anode current collector 95 and the cathode 60 is connected to the container or lid 54, 56 via the cathode current collector 97.

Both the anode current collector 95 and cathode current collector 97 are composed of an electrically conductive material. It should be noted that the electrochemical cell 50 of the present invention, as illustrated in FIG. 2, can be of either a rechargeable (secondary) or non-rechargeable (primary) chemistry of a case negative or case positive design. The specific geometry and chemistry of the electrochemical cell 50 can be of a wide variety that meets the requirements of a particular primary and/or secondary cell application.

FIGS. 7 to 10 illustrate another embodiment of a casing for an electrochemical cell according to the present invention. The casing comprises a main body portion 110 having opposed open ends, a lower lid 112 and an upper lid 114. The main body portion 110 is machined from a solid bar of Grade 5 titanium or Grade 23 titanium and comprises a sidewall 116 having a thickness 118 extending to an upper open end 120 and a lower open end 122. A surrounding upper edge 116A defines the upper open end 120. A surrounding lower edge 116B defines the lower open end 122. In a broader sense, the lower lid 112 is also referred to as one of a first or second lid and the upper lid 114 is referred to as the other of the first or second lid.

Figure 8:
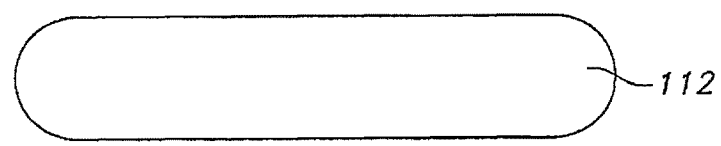
FIG. 8 is a plan view of a lower lid 112 for closing the lower open end of the main body portion 110 shown in FIG. 7.
Figure 10:
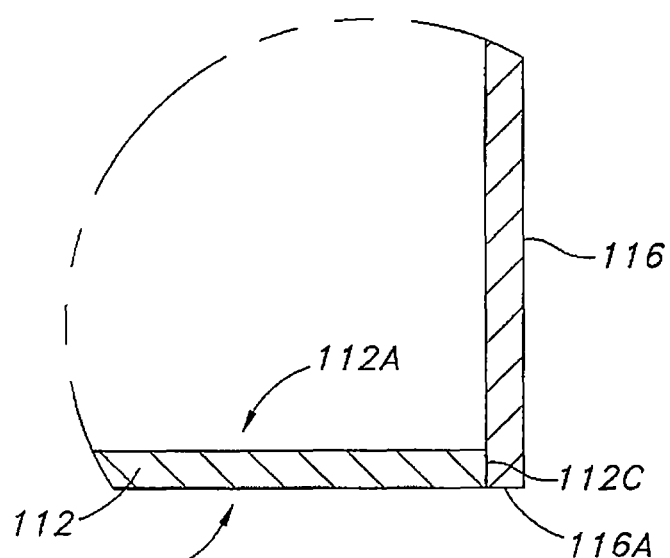
FIG. 10 is a cross-sectional view, partly broken away, showing the lower lid 112 fit inside the lower open end of the sidewall 116 of the main body portion 110 shown in FIG. 7.

As shown in FIG. 8, the lower lid 112 is stamped from Grade 1 titanium or Grade 2 titanium to a size and shape to close the lower open end 122. As shown in FIG. 10, the lower lid 112 has upper and lower planar faces 112A, 112B extending to a surrounding edge 112C. To build a cell casing, the lower lid 112 is first fit into the lower open end 122 of the main body portion 110 with the surrounding lower lid edge 112C positioned inside the sidewall 116. In this position, the lower face 112B of the lower lid 112 is substantially co-planar with the lower edge 116A of the sidewall 116 of the main body portion 110. A weld (not shown) according to the present invention secures the lower lid 112 to the sidewall 116 at the lower edge 116A thereof.

Figure 9:
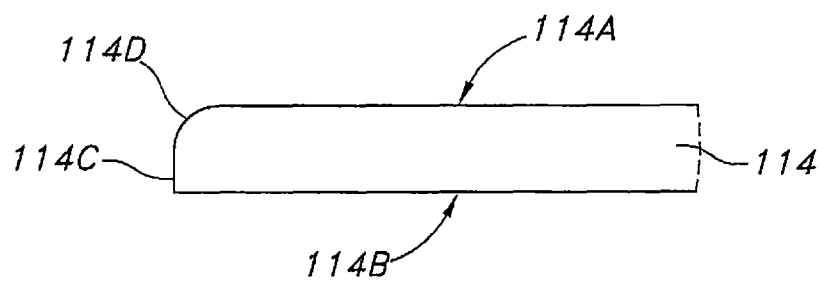
FIG. 9 is a plan view, partly broken away, of an upper lid 114 for closing the upper open end of the main body portion 110 shown in FIG. 7.

As shown in FIG. 9, the upper lid 114 comprises upper and lower planar faces 114A, 114B extending to a surrounding edge. The lower planar face 114B meets a substantially cylindrical portion 114C of the edge. The cylindrical portion 114C in turn meets a radiused edge portion 114D extending to the upper planar face 114A. After the previously described anode 58, cathode 60 and intermediate separator 100 forming an electrode assembly 62 are positioned inside the main body portion 110 having its lower open end closed by lower lid 112, the upper lid 114 is supported on the upper edge 116B of the casing sidewall 116. In this position, the cylindrical portion 114C is substantially aligned with an outer surface 116C of the main body portion 110. A weld (not shown) according to the present invention secures the upper lid 114 to the sidewall 116 of the main body portion 110 at the upper edge 116B thereof.

Figure 1:
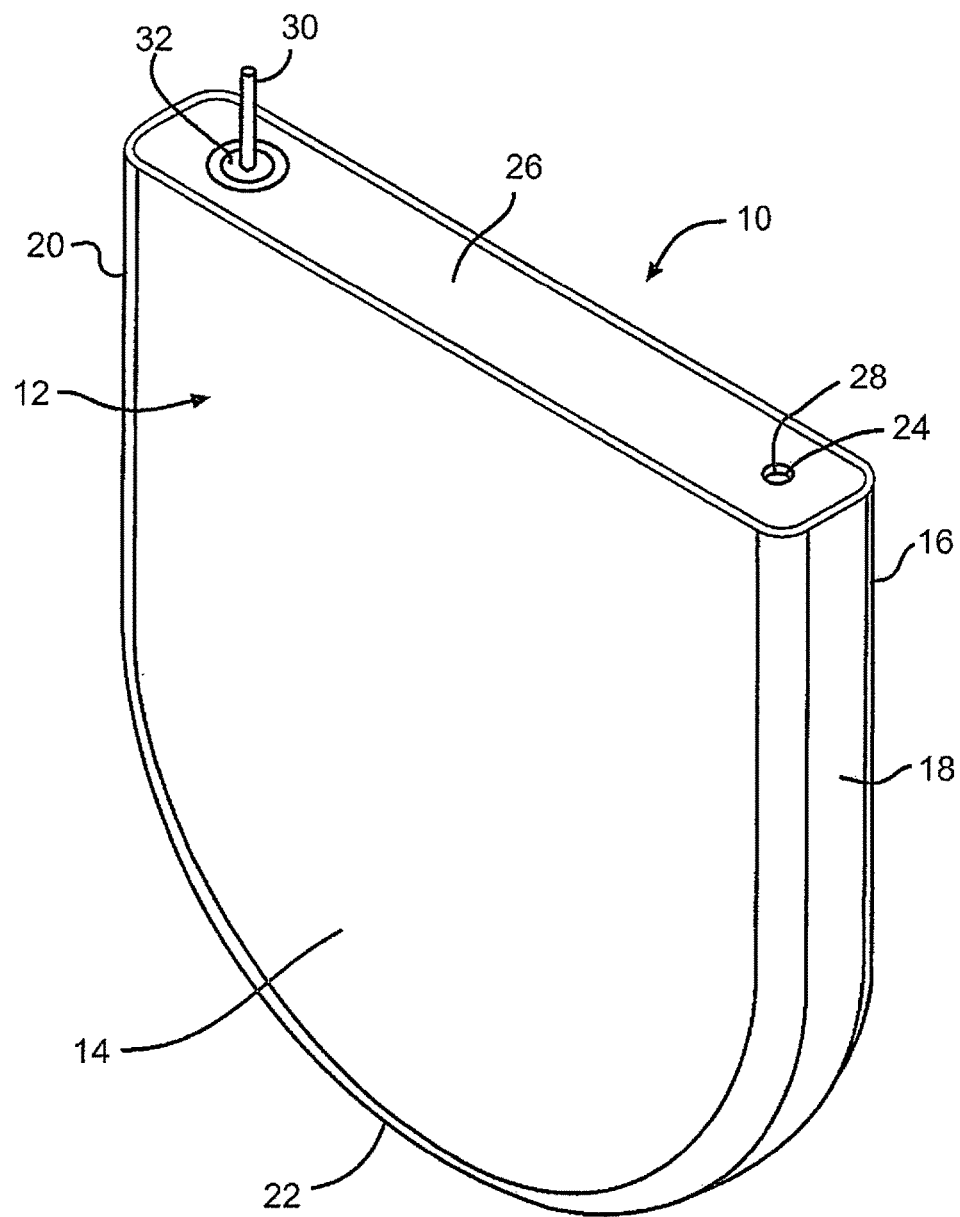
FIG. 1 is a perspective view of a conventional electrochemical cell 10.

The thusly formed casing including terminal connections for the anode 58 and cathode 60 as described herein is then activated with a suitable electrolyte filled into the casing through a fill opening, for example the fill opening 24 shown in FIG. 1. The fill opening 24 is then closed with a closure means 28 to thereby hermetically seal the casing.

A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector 95.

The cathode of a primary cell is of electrically conductive material, preferably a solid material. The solid cathode may comprise a metal element, a metal oxide, a mixed metal oxide, and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell, the cathode active material is mixed with a binder material such as a powdered fluoro-polymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent, and about 94 weight percent of the cathode active material.

The cathode 60 may be prepared by rolling, spreading or pressing the cathode active mixture onto a suitable cathode current collector 97. Cathodes prepared as described above are preferably in the form of a strip wound with a corresponding strip of anode material in a structure similar to a "jellyroll" or a flat-folded electrode stack.

In order to prevent internal short circuit conditions, the cathode 60 is separated from the anode 58 by a separator 100. The separator 100 is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.), and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4/LiCF_3SO_3$, and mixtures thereof.

Suitable low viscosity solvents include esters, linear and cyclic ethers and dialkyl carbonates such as tetrahydrofuran (THE), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative case negative primary electrochemical cell, the active material of cathode is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In secondary electrochemical systems, the anode 58 comprises a material capable of intercalating and de-intercalating an alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode 60 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

The lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

The respective current collectors 95, 97 are selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such battery chemistries because they exhibit high oxidative stability toward cathode materials and good kinetic stability toward anode materials.

The casing lids 56, 112 and 114 comprise an opening to accommodate the glass-to-metal seal/terminal pin feedthrough for the cathode. The anode or counter electrode is preferably connected to the open-ended container 54 of the casing 52 or to the lid 56 or for the embodiment shown in FIGS. 7 to 10, to the main body portion 110 or lids 112, 114. An additional opening in the respective lids is provided for electrolyte filling. The cell is thereafter filled with the electrolyte described hereinabove and hermetically sealed such as by close-welding a titanium plug over the fill hole, but not limited thereto.

Now, it is therefore apparent that the present invention has many features among which are reduced manufacturing cost and construction complexity. While embodiments of the present invention have been described in detail, such is for the purpose of illustration, not limitation.

What is claimed is:
1. An electrochemical cell, comprising:
 a) a casing, comprising:
  i) a main body portion formed of Grade 5 titanium or Grade 23 titanium, the main body portion comprising a sidewall extending to a first open end and a second open end;
  ii) a first lid of Grade 1 titanium or Grade 2 titanium, the first lid being sized and shaped to close the first open end of the main body portion, wherein a first weld secures the first lid to the sidewall at the first open end thereof; and
  iii) a second lid of Grade 1 titanium or Grade 2 titanium, the second lid being sized and shaped to close the second open end of the main body portion, wherein a second weld secures the second lid to the sidewall at the second open end thereof; and b) an electrode assembly comprising an anode and a cathode separated from direct physical contact by a separator, wherein the electrode assembly resides within the casing; and c) an electrolyte provided in the casing to activate the electrode assembly.

2. The electrochemical cell of claim 1, wherein the casing sidewall has a constant thickness extending to the spaced apart first and second open ends.

3. The electrochemical cell of claim 1, wherein the first and second welds securing the first and second lids to the main body portion are capable of withstanding a burst pressure that ranges from about 800 psi to about 1,500 psi.

4. The electrochemical cell of claim 1, of either a primary or a secondary chemistry.

5. The electrochemical cell of claim 1, wherein the first and second welds have respective Vickers micro hardnesses ranging from about 150 (HK100) to about 350 (HK100).

6. An electrochemical cell, comprising:
a) a casing, comprising:
i) a main body portion formed of a first conductive material, the main body portion comprising a sidewall extending to an upper open end and a lower open end;
ii) a lower lid of a second conductive material, wherein the lower lid fits inside the sidewall of the main body portion at the lower open end thereof with a first weld securing the lower lid to the sidewall thereof; and
iii) an upper lid of a third conductive material, wherein the upper lid is supported on an upper edge of the sidewall of the main body portion with a second weld securing the upper lid to the sidewall thereof; and
b) an electrode assembly comprising an anode and a cathode separated from direct physical contact by a separator, wherein the electrode assembly resides within the casing; and
c) an electrolyte provided in the casing to activate the electrode assembly.

7. The electrochemical cell of claim 6, wherein the upper lid has spaced apart upper and lower faces extending to a peripheral edge, and wherein the peripheral edge has a radiused portion meeting the upper face and a cylindrical portion meeting the lower face.

8. The electrochemical cell of claim 6, wherein the first and second welds have respective Vickers micro hardnesses ranging from about 150 (HK100) to about 350 (HK100).

9. The electrochemical cell of claim 6, wherein the first and second welds securing the lower and upper lids to the main body portion are each capable of withstanding a burst pressure that ranges from about 800 psi to about 1,500 psi.

10. The electrochemical cell of claim 6, of either a primary or a secondary chemistry.

11. The electrochemical cell of claim 6, of a primary chemistry having the anode of lithium and the cathode of a cathode active material selected from the group consisting of a carbonaceous material, a fluorinated carbon, a metal, a metal oxide, a mixed metal oxide, a metal sulfide, and mixtures thereof.

12. The electrochemical cell of claim 6, wherein one of the anode and the cathode is electrically connected to a terminal lead supported in one of the lower and upper lids, the terminal lead being electrically insulated from the casing, and wherein the other of the anode and cathode is electrically connected to the casing.

13. The electrochemical cell of claim 6, of a secondary chemistry having the anode of a carbonaceous material and the cathode of a cathode active material selected from the group consisting of $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

14. An electrochemical cell, comprising:
a) a casing, comprising:
i) a main body portion formed of Grade 5 titanium or Grade 23 titanium, the main body portion comprising a sidewall extending to a first open end and a second open end;
ii) a first lid of Grade 1 titanium or Grade 2 titanium, the first lid being sized and shaped to close the first open end of the main body portion, wherein a first weld secures the first lid to the sidewall at the first open end thereof; and
iii) a second lid of Grade 1 titanium or Grade 2 titanium, the second lid being sized and shaped to close the second open end of the main body portion, wherein a second weld secures the second lid to the sidewall at the second open end thereof; and
b) a feedthrough supported by one of the first and second lids, the feedthrough comprising a terminal pin that is electrically insulated from the one of the first and second lids by a glass-to-metal seal;
c) an electrode assembly comprising an anode and a cathode separated from direct physical contact by a separator, wherein the electrode assembly resides within the casing with the anode being electrically and mechanically connected to the casing and the cathode being electrically and mechanically connected to the terminal pin of the feedthrough; and
d) an electrolyte provided in the casing to activate the electrode assembly.

15. The electrochemical cell of claim 14, wherein the first lid has spaced apart upper and lower faces extending to a peripheral edge, and wherein the peripheral edge has a radiused portion meeting the upper face and a cylindrical portion meeting the lower face of the first lid, and wherein with the first lid secured to the sidewall of the main body portion of the casing to thereby close the first open end, the cylindrical portion is substantially aligned with an outer surface of the sidewall.

16. The electrochemical cell of claim 14, of either a primary or a secondary chemistry.

* * * * *